United States Patent Office 3,235,270
Patented Feb. 15, 1966

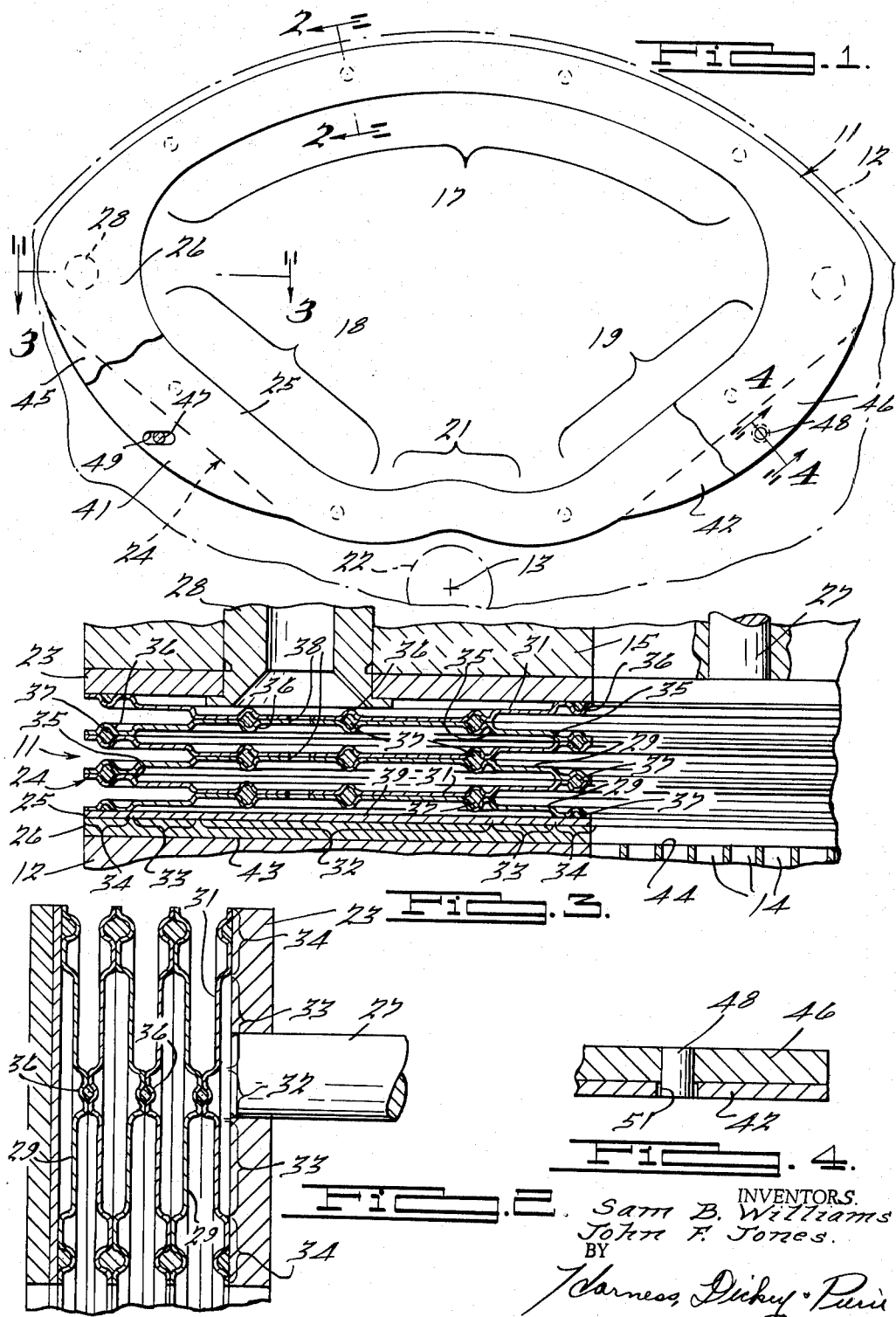

3,235,270
HIGH PRESSURE REGENERATOR SEAL
Sam B. Williams, Walled Lake, and John F. Jones, Berkley, Mich., assignors to Williams Research Corporation, Walled Lake, Mich., a corporation of Michigan
Filed Apr. 26, 1963, Ser. No. 275,925
9 Claims. (Cl. 277—34.3)

This invention relates to seals, and more particularly to high pressure dynamic seals for use with rotary regenerator cores of gas turbines.

It is an object of the invention to provide a novel and improved high pressure dynamic seal for gas turbine regenerator cores which is mainly of metal construction, has low fabrication and maintenance costs, and is extremely reliable in use.

Other objects, features, and advantages of the present invention will become apparent from the subsequent description, taken in conjunction with the accompanying drawings, in which:

FIGURE 1 is a side elevational view of a seal incorporating the principles of the invention and adapted to engage a rotary regenerator core;

FIGURE 2 is an enlarged cross-sectional view taken along the line 2—2 of FIGURE 1 and showing the cross-sectional configuration of the bellows sections;

FIGURE 3 is an enlarged cross-sectional view taken along the line 3—3 of FIGURE 1 and showing the construction in the vicinity of the compressed air connection; and FIGURE 4 is an enlarged fragmentary cross-sectional view taken along the line 4—4 of FIGURE 1 and showing one of the pin-and-aperture connections between one of the subshoe and the rubbing shoe.

Briefly, the illustrated embodiment of the invention comprises a segmentally shaped metal bellows formed as a closed loop and fabricated of overlapping sections of thin sheet metal having corrugated cross-sectional shapes. Pockets in the form of elongated depressions are formed in the sections, the pockets of adjacent sections being in registry and being adapted to receive strips or rings of brazing metal. A metal base is disposed on one side of the bellows sections, and a subshoe is disposed on the other side, the bellows sections having brazing pockets facing the base and subshoe so that the assembly comprising the bellows sections, base and subshoe may be united to form a common chamber by filling the pockets with brazing strips and placing the assembly in a brazing furnace. A rubbing shoe of metal with a surface having appropriate wear, hardness, flexural and heat-resistant qualities is removably carried by the subshoe, the latter having spaced ears extending from the bellows and having apertures for the reception of pins carried by ears on the rubbing shoe. A compressed air connection is carried by the base, and the bellows sections have interconnecting apertures to form the common chamber therein.

Referring more particularly to the drawings, the seal is generally indicated at 11 and is adapted to engage a segmental portion of a rotary regenerator core 12 having an axis of rotation 13 and flat seal-engageable ends with air passages 14 extending axially through the core between the flat ends. Conventionally, circumferentially spaced segments of such a core are disposed within compressed air ducts or housing portions 15 leading from the turbine compressor to the burner or combustion chamber, and the intermediate segments are disposed within ducts (not shown) leading from the last turbine stage to the turbine exhaust. Seal 11 is especially adapted for use in connecting core 12 to the compressed air ducts.

The general shape of seal 11 is shown best in FIGURE 1, the seal having an arcuate outer portion indicated at 17 concentric with axis 13, generally radial intermediate portions 18 and 19, and an inner portion 21 connecting sections 18 and 19 and shaped so as to provide clearance for a core hub shown in phantom lines at 22. Portions 17, 18, 19 and 21 are preferably faired into each other to provide a smooth configuration of the entire seal.

Seal 12 comprises a base 23, a bellows indicated generally at 24, a subshoe 25 and a rubbing shoe 26. All of these parts have the same general configuration, namely, portions 17, 18, 19 and 21, although subshoe 25 and rubbing shoe 26 have outwardly extending ears on portions 18 and 19 to be later described.

Base 23 is adapted to be secured to duct or housing portion 15 of the gas turbine. The base is constructed of a sheet or plate of metal which is of sufficient thickness to provide the necessary support rigidity for bellows 24. A plurality of pins 27 are secured to the face of base 23 which engages housing portion 15, apertured portions being provided in housing portion 15 for the reception of pins 27 so as to secure base 23 thereto. Base 23 is also provided with a compressed air connection 28 which extends through an apertured portion in housing portion 15. Connection 28 is adapted to lead compressed air to the interior of bellows 24.

Bellows 24 comprises a plurality of thin sheet metal members 29 and 31. These members are corrugated so as to permit a certain amount of flexibility in the direction of axis 13. The corrugations are oppositely directed in bellows sections 29 and 31 so that the sections may be alternately stacked as seen in FIGURES 2 and 3, these sections being engageable with each other alternately at their inner and outer portions. More particularly, each section 29 or 31 has a central inner flat zone 32, two intermediate flat zones 33, and two outer flat zones 34, these zones being in parallel relation but stepped away from each other with the steps 35 going in opposite directions in the case of sections 29 and 31.

Elongated depressions 36 of semicircular cross section are formed in inner zone 32 and outer zones 34 of each section 29 and 31. A single depression 36 is formed in each outer zone 34 of sections 29 and 31, these depressions being continuous around the entire extent of the sections. Inner zones 32 have a varying number of depressions 36, depending upon the total width of bellows 24. At the junctions of seal portions 18 and 19 with portion 17, the seal is relatively wide, as seen in FIGURE 3, whereas the remaining portions of seal 11 are relatively narrow, as seen in FIGURE 2. This difference in width is accomplished by varing the width of zone 32. Where zone 32 is relatively wide, three depressions 36 extend in substantially parallel relation in bellows sections 29 and 31. Where the bellows is relatively narrow, only a single depression 36 is formed in zone 32 of each bellows section.

The depressions in adjacent sections 29 and 31 face in opposite directions and are in registry so that strips 37 of brazing metal may be placed therein. In the case of contacting zones 32 or 34 of adjacent sections 29 or 31, the cross-sectional shape of strips 37 is approximately circular or elliptical; in the case of depressions 36 in zones 34 which engage base 23 or subshoe 25, the cross-sectional shape of strip 37 is approximately semicircular. It should be noted that the bellows section adjacent subshoe 25 is a section 29 whereas that of adjacent base 23 is a section 31, so that the zones 34 of the bellows sections in each case may engage their respective members. A total of six bellows sections 29 and 31 is shown in the illustrated embodiment, although a different number could be used within the principles of the invention. In order to provide communication among the individual chambers formed between the bellows sections and create a common chamber therein, apertured portions 38 are provided in zones 32 of the bellows sections. These apertured portions are shown as being aligned with the compressed air connection 28 in FIGURE 3.

Subshoe 25 comprises a sheet metal member having substantially the same shape as base 23 and bellows 24, that is, with portions 17, 18, 19 and 21. The thickness of subshoe 25 is substantially less than that of base 23 so as to provide substantial flexibility in the direction of axis 13. Surface 39 of subshoe 25 faces the adjacent bellows section 29 and is engageable with the zones 34 thereof. Two ears 41 and 42 are formed on subshoe 25, these ears extending from portions 18 and 19 of the seal in a direction away from the area enclosed by the seal. Ears 41 and 42 are shown as extending substantially the entire length of seal portions 18 and 19 and being faired into the remainder of the subshoe.

Rubbing shoe 26 likewise may comprise a metallic member, this member having the same outline as that of subshoe 25 but being slightly thicker, although still having sufficient flexibility in the direction of axis 13 to accomplish the sealing function, that is, to accommodate variations in the distance between the facing surfaces of core 12 and housing portion 16 during rotation of the core. In addition, rubbing shoe 26 should have a surface 43, engageable with core surface 44, which is sufficiently smooth to present a minimum of friction and to prevent wear or scoring of the core during operation. The material of which shoe 26 is fabricated is also preferably such as will withstand the high temperatures to which it will be subjected. If desired, a thin layer (not shown) of a hard low friction material such as Pyroceram, capable of withstanding high temperatures, can be bonded to surface 43 of rubbing shoe 26, the main portion of the rubbing shoe being fabricated of metal. Pyroceram is manufactured by the Owen Corning Glass Company of Corning, New York, and is described in volume 6, page 208, of the McGraw-Hill Encyclopedia of Science and Technology. It is a shock-resistant, crystalline type of glass ceramic having a negligible coefficient of thermal expansion.

The means for holding rubbing shoe 26 to subshoe 25 comprises a pair of ears 45 and 46 on rubbing shoe 26 which overlap and have the same shape as ears 41 and 42, respectively, of subshoe 25. Pins 47 and 48 are carried by ears 45 and 46, respectively, pin 47 being disposed within an elongated aperture or slot 49 in ear 41, while pin 48 is disposed within a circular aperture 51 in ear 42. This retention means will prevent undesired relative shifting between rubbing shoe 26 and subshoe 25, but the facing surfaces of the subshoe and rubbing shoe are otherwise shown as being in loose contacting engagement. The presence of elongated slot 49 will permit expansion and contraction of rubbing shoe 26 with respect to subshoe 25 in the general direction of the longer dimension of seal 11, that is, in the general direction of extent of outer portion 17.

As a suitable method of assembly of base 23, bellows 24 and subshoe 25, these parts may be assembled, together with brazing strips 37, and the assembly placed in a brazing furnace. The outward flow of brazing metal onto the adjacent surfaces of bellows section zones 32 and 34 will unite the bellows sections to each other and will also secure base 23 and subshoe 25 to their adjacent bellows sections. Rubbing shoe 26 may then be assembled to subshoe 25 by inserting pins 47 and 48 in slot 49 and aperture 51, respectively, base 23 being mounted on housing portion 16 by means of pins 27.

In operation, compressed air will be supplied to connection 28, causing pressurization of the common chamber formed by base 23, bellows 24 and subshoe 25, thus forcing rubbing shoe 26 against rotating core 12. The expandability of bellows 24 will permit substantial variations in the distance between core 12 and housing portion 16, and the flexural properties of subshoe 25 and rubbing shoe 26 will accommodate variations in the distance between the core and housing member which may occur, for example, due to distortions created by temperature changes during operation. The strength of seal 11 in directions extending radially outwardly from the segmental area enclosed by the seal will be relatively high, thus preventing undesired distortions of the seal or its rubbing shoe 26 due to the outward pressure of compressed air passing through this area.

Should it be desired to replace rubbing shoe 26, it is merely necessary to remove the rubbing shoe from subshoe 25 by withdrawing pins 47 and 48 from slot 49 and hole 51, respectively. The remaining portions of seal 11 may remain intact in assembled position and the replacement shoe 26 mounted on subshoe 25.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a seal for use between stationary and movable members, a metal base adapted to be secured to the stationary member, a metal bellows comprising alternate oppositely facing corrugated bellows sections having inner and outer zones in alternate engagement, a bellows section at one end of said bellows being engageable with said base, a subshoe engageable with the bellows section on the other end of said bellows, depressions formed in the surfaces of said bellows sections which are in contact with each other and with said base and subshoe, brazing material in said depressions and bonding the adjacent surfaces of said bellows to each other and to said base and said subshoe, and a rubbing shoe removably mounted on the surface of said subshoe facing away from said bellows.

2. The combination according to claim 1, further provided with apertured portions in said bellows sections to form a common chamber enclosed by said bellows sections, base and subshoe, and a connection carried by said base for pressurizing said common chamber.

3. In a seal for use between stationary and movable members, a flat metal base adapted to be secured to the stationary member, a bellows comprising a plurality of metal bellows sections, each section having a central inner zone, two intermediate zones and two outer zones, at least the inner and outer zones being parallel to said flat base, the zones being interconnected by stepped portions to allow flexibility of the bellows sections, the stepped portions of adjacent bellows being in opposite directions, adjacent bellows sections being alternately engageable at their inner and outer zones, one end of said bellows being engageable with said base, a metal subshoe engageable with the other end of said bellows, depressions formed in said inner and outer zones, the depressions of adjacent bellows facing each other and being in registry so as to form spaces therebetween, additional depressions formed in the zones of the end bellows sections engageable with said base and subshoe to form additional spaces, brazing metal in said spaces, said brazing metal uniting said bellows sections, base and subshoe into an integral unit, apertured portions in said bellows sections forming a common chamber enclosed by the bellows, base and subshoe, means for pressurizing said common chamber, a rubbing shoe, and means removably mounting said rubbing shoe on said subshoe.

4. The combination according to claim 3, said last-mentioned means comprising a plurality of ears formed on said subshoe and extending from said bellows, ears on said rubbing shoe overlapping said subshoe ears, and pin-and-aperture connections carried by said ears.

5. In a high pressure dynamic seal for use in conjunction with a rotary gas turbine regenerator core, a metal base, means for securing said base to a stationary housing portion of the gas turbine, the configuration of said base being such as to enclose the area through which compressed air is to pass, a metal bellows having one side secured to said base, a metal subshoe secured to the other side of said bellows, a metal rubbing shoe engageable with said subshoe, said bellows having the same configuration as said base, said subshoe and rubbing shoe having the same general configuration as said bellows and base but having overlapping ears, and means for mounting said rubbing shoe on said subshoe comprising pin-and-aperture connections carried by said ears.

6. In a high pressure dynamic seal for use between a rotary regenerator of the type having flat ends and a compressed air housing portion, a flat metal base, means for mounting said base on said housing portion facing one of said flat regenerator ends, the configuration of said base being such as to enclose a generally segmentally shaped area through which the compressed air is to pass, a bellows comprising a plurality of stacked flexible metal bellows sections, adjacent sections having zones in engagement with each other, said bellows having the same configuration as said base, one end section of said bellows being engageable with said base, a flat metal subshoe engageable with the other end bellows section, said subshoe having the same general configuration as said base and said bellows but having ears extending outwardly in the same plane as the subshoe, a flat metal rubbing shoe overlapping and having the same configuration as said subshoe including ears overlapping said subshoe ears, both said subshoe and said rubbing shoe having sufficient flexural characteristics in the direction of expansion of said bellows to follow variations in the distance between said regenerator surface and said housing portion, and pin-and-aperture means carried by said ears and removably securing said rubbing shoe to said subshoe.

7. The combination according to claim 6, said pin-and-aperture means including a pair of pins carried by said rubbing shoe ears and extending toward said subshoe ears, a circular aperture in one of said subshoe ears and receiving one of said rubbing shoe pins, and an elongated slot in the other subshoe ear receiving the other rubbing shoe pin.

8. The combination according to claim 6, each of said bellows sections comprising a central inner zone, two intermediate zones and two outer zones, the outer zones of said end bellows sections engaging said base and said subshoe, respectively, adjacent bellows sections being alternately engageable at the inner and outer zones, depressions formed in said inner and outer zones, and brazing material in said depressions and uniting said bellows sections with each other and said base and said subshoe, respectively.

9. The combination according to claim 8, further provided with apertured means in said inner bellows section zones to form a common chamber enclosed by said bellows, base and subshoe, and means carried by said base for pressurizing said common chamber.

References Cited by the Examiner
UNITED STATES PATENTS

| | | | |
|---|---|---|---|
| 1,763,574 | 6/1930 | Williams | 277—88 X |
| 2,005,587 | 6/1935 | Lorig | 277—88 |
| 2,969,644 | 1/1961 | Williams et al. | 277—34 X |

FOREIGN PATENTS 647,650　12/1950　Great Britain.

LAVERNE D. GEIGER, *Primary Examiner.*

SAMUEL B. ROTHBERG, *Examiner.*